United States Patent [19]

Sandstrom

[11] 4,430,487

[45] Feb. 7, 1984

[54] SHORTSTOP FOR SYNTHETIC CIS-1,4-POLYISOPRENE

[75] Inventor: Paul H. Sandstrom, Tallmadge, Ohio

[73] Assignee: The Goodyear Tire & Rubber Company, Akron, Ohio

[21] Appl. No.: 418,918

[22] Filed: Sep. 16, 1982

[51] Int. Cl.$^3$ .............................................. C08F 2/42
[52] U.S. Cl. ................................. 526/83; 525/332.7; 526/340.2
[58] Field of Search .............................. 526/83, 340.2

[56] References Cited

U.S. PATENT DOCUMENTS

| | | | |
|---|---|---|---|
| 3,047,559 | 7/1962 | Mayor et al. | 526/340.2 |
| 3,114,743 | 12/1963 | Horne, Jr. | 526/340.2 |
| 3,462,405 | 8/1969 | Schoenberg | 526/340.2 |
| 3,467,641 | 9/1969 | Taylor | 526/83 |
| 3,631,016 | 12/1971 | Witte et al. | 526/83 |

Primary Examiner—Stanford M. Levin
Attorney, Agent, or Firm—Alvin T. Rockhill

[57] ABSTRACT

The present invention is an improved polymerization process which comprises polymerizing isoprene under solution polymerization conditions in a hydrocarbon solvent with a catalyst system comprising a mixture of titanium tetrachloride and a trialkylaluminum compound, wherein the polymerization is shortstopped with 4,7-diaza-decane-1,10-diamine.

7 Claims, 1 Drawing Figure

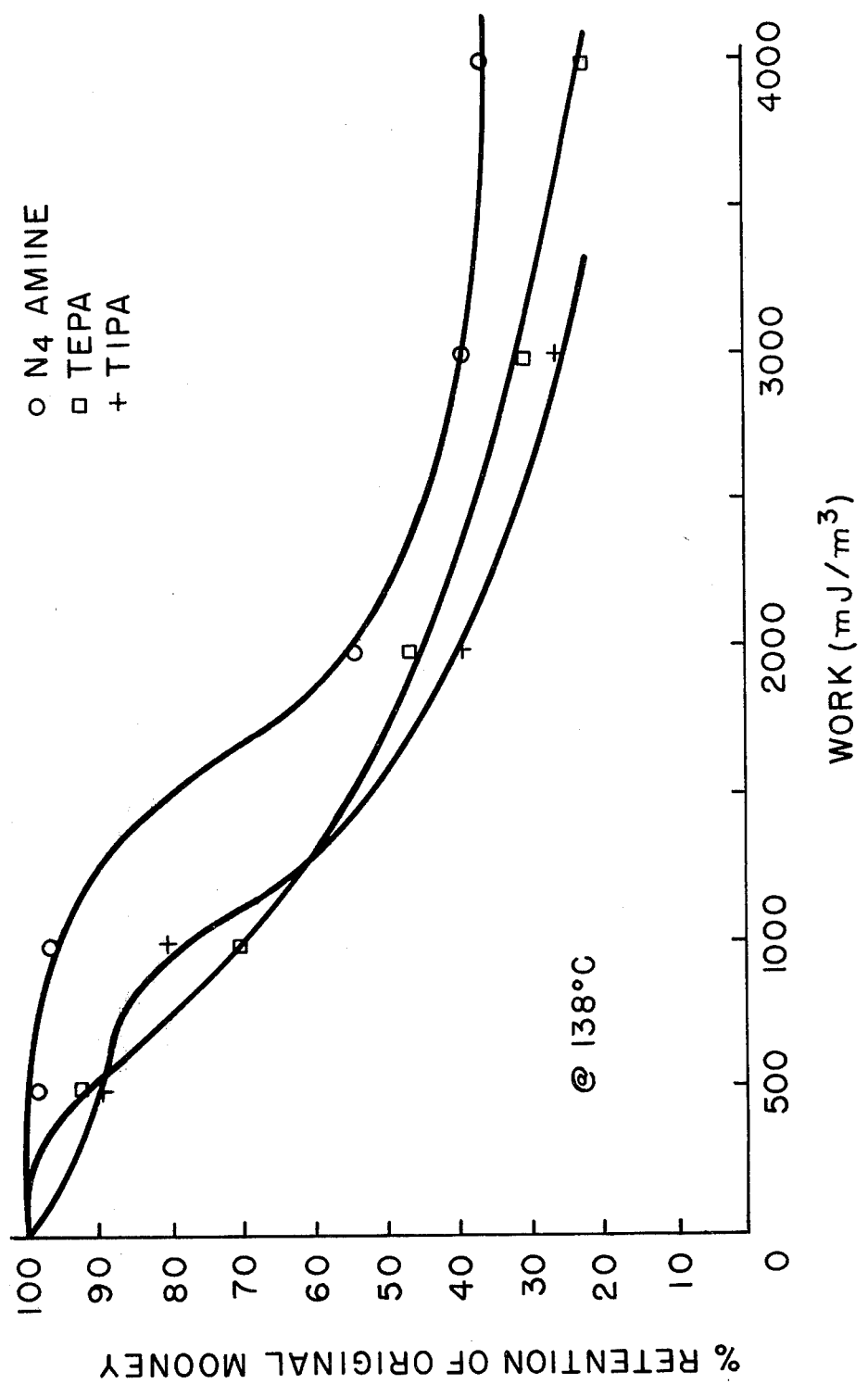

SHORTSTOP FOR SYNTHETIC CIS-1,4-POLYISOPRENE

TECHNICAL FIELD

This invention relates to a process of producing a high cis-1,4-polyisoprene and more specifically relates to the shortstopping of the same which has been prepared by polymerizing isoprene under solution polymerization conditions with a catalyst system which comprises the use of a mixture of trialkylaluminum compound and a titanium tetrachloride.

BACKGROUND OF THE INVENTION

The polymerization of isoprene to form a high cis-1,4-polyisoprene is well-known in the art. Under the usual or conventional conditions of polymerization of isoprene to form a high cis-1,4-polyisoprene, isoprene and an inert solvent, such as hexane and pentane are mixed together and polymerized with a catalyst system comprising a mixture of a trialkylaluminum compound, such as triisopropylaluminum, triethylaluminum, or triisobutylaluminum, or these trialkylaluminums complexed with an ether, such as diphenyl ether, anisole, or dibutylether, mixed with a cocatalyst which is usually a transition metal halide. Of particular interest in the formation of the high cis polymer is titanium tetrachloride. This produces a cement of polyisoprene which has a high cis-1,4-content. Under these polymerization conditions the polymerization is continued until the desired conversion is reached and then the catalyst system is usually destroyed by the addition of an amine compound, such as tetraethylene pentamine (TEPA) or triisopropanol amine (TIPA), or the like.

The function of these amines, which will be called shortstops or shortstoppers in this application, is to destroy the catalyst system and when the synthetic polyisoprene is mixed with an antioxidant to cause the polyisoprene to become somewhat more stabilized upon storage. In the past, high cis 1,4-polyisoprene which has been shortstopped with TIPA produces a polymer which is low in color, that is the color of almost water-white. On the other hand, when a high cis-1,4-polyisoprene is shortstopped with TEPA, a polymer is produced which is yellow in color, but has better dynamic properties when compared with a polyisoprene which has been shortstopped with TIPA.

The desirable features of a finished polymer of high cis-1,4-polyisoprene should include a light color approaching whiteness and the ability of the polymer to retain this light color, not only after prolonged exposure of the raw rubber to ultra-violet light and particularly, sunlight, but also during and after the critical conditions encountered in compounding, processing and curing of these rubber compounds.

The present invention is directed to a new shortstop to stop the polymerization and produce in the polyisoprene a low color polymer which has the desired dynamic properties in the cured state, when employed in any such applications as tires. In other words, the use of the shortstop of this invention provides a synthetic polyisoprene with the combined features of both the conventional shortstops, TIPA and TEPA. In addition, it has been found that the use of the shortstop of this invention provides an improved green strength and better Mooney stability on storage.

SUMMARY OF INVENTION

The present invention is an improved polymerization system which comprises polymerizing isoprene under solution polymerization conditions in a hydrocarbon solvent with a catalyst system comprising a mixture of titanium tetrachloride and a trialkylaluminum or a trialkylaluminum etherate compound, wherein the polymerization is shortstopped with 4,7-diaza-decane-1,10-diamine.

DETAILED DESCRIPTION

To form high cis-1,4-polyisoprene, isoprene is polymerized in an inert solvent using as a catalyst system a mixture of titanium tetrachloride (TiCl$_4$) and an organoaluminum compound. The organoaluminum compound which is normally employed is a trialkylaluminum or a trialkylaluminum etherate.

In U.S. Pat. No. 3,114,743, patented Dec. 17, 1963, there is disclosed a process for the polymerization of isoprene to form a rubber which is a high molecular weight 1,4 all-cis polyisoprene, by contact of monomeric isoprene with a catalyst prepared by the reaction between substantially equimolar proportions of (1) a compound of a heavy metal occurring from the fourth to the sixth position of the long periods of the periodic table and (2) an organoaluminum compound as hereinafter defined. The disclosure in U.S. Pat. No. 3,114,743 is herein incorporated by reference. Further, in the aforementioned patent there is disclosed that it is most desirable to use one mole of a trialkylaluminum for each mole of titanium tetrachloride. However, a more preferable range is 0.5 to 1 to 1.5 to 1 of the titanium-/aluminum molar ratio.

In U.S. Pat. No. 3,047,559 patented July 31, 1962, there is disclosed a method of polymerizing isoprene in the presence of a catalytic amount of a complex of titanium tetrachloride with an etherate of an organo metallic compound of the general formula:

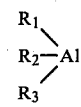

in which R$_1$ is selected from alkyl, aryl and aralkyl groups and R$_2$ and R$_3$ are selected from alkyl, aryl, aralkyl groups and hydrogen. The disclosure in this patent is incorporated herein by reference.

In U.S. Pat. No. 3,462,405, patented Aug. 19, 1969, there is disclosed a process for the polymerization of 2-alkyl substituted conjugated diolefins to form high cis-1,4 addition polymers which comprises contacting at least one 2-alkyl substituted conjugated diolefin, under polymerization conditions, with a catalyst prepared from mixtures of titanium tetrachloride and an organoaluminum compound selected from the group consisting of aluminum trialkyls and aromatic etherates of aluminum trialkyls wherein the molar ratio of the Al/Ti is within the range of from 0.6/1 to 1.2/1. The catalyst is prepared by bringing the titanium tetrachloride and the organoaluminum compound in contact with each other while dissolved in an inert solvent so that at no time does the Al/Ti mole ratio of the mixture exceed 1.2/1 and the catalyst has a final molar concentration of titanium between 0.1 and 1.0. The disclosure in this patent is incorporated herein by reference.

The polymerization of isoprene to form high cis 1,4-polyisoprene is performed usually in a solution polymerization system using as a catalyst, titanium tetrachloride and an organoaluminum compound, such as aluminum trialkyls or etherates of aluminum trialkyls. When employing an aluminum trialkyl as one of the catalyst components the organoaluminum compound possesses the general structure:

wherein $R_1$ and $R_3$ are hydrocarbon radicals.

Representative of the aluminum trialkyl compounds are aluminum triethyl, aluminum tri-n-propyl, aluminum triisopropyl, aluminum tri-n-butyl, aluminum triisobutyl, aluminum trihexyl, aluminum triphenyl, and the like.

The organo aluminum compound may be an etherate of the trialkyl aluminums. Representative of such trialkyl aluminum etherates are the etherates which are prepared from a reaction of an aluminum trialkyl with the desired ethers.

Examples of aromatic ethers are diphenyl ether and anisole. Examples of such etherates are the anisole and diphenyl etherates of aluminum triethyl, aluminum triisobutyl, aluminum tripropyl and the like. The phenyl etherate of triisobutyl aluminum, triethyl aluminum, and triisobutyl aluminum are also useful. The phenyl and anisole etherates of aluminum triphenyl may also be employed in the process of this invention.

Aliphatic ethers may be used to form the trialkylaluminum etherates. Examples of the ethers are diethyl, dipropyl, dibutyl, diisobutyl ethers and the like. In fact any ether may be used to prepare the trialkyl or triphenyl etherates of this invention.

The titanium tetrachloride employed in the present invention should be chemically pure and anhydrous, as water and certain other impurities are deleterious to good catalytic activity.

In the polymerization of isoprene to form high cis-1,4-polyisoprene certain general polymerization conditions must be observed. The polymerization of isoprene by means of the catalyst of this invention is usually conducted by polymerizing the monomers in an inert solvent or a diluent. However, this is not to say that the practice of the invention cannot be conducted in bulk, i.e. without the use of solvents. If it is desired to employ solvents as an inert diluent, the aromatic solvents such as benzene, toluene and xylene, saturated aliphatic hydrocarbons, such as pentane, hexane, heptane, and cyclohexanes have been found to be inert and representative of the solvents or diluents useful in the invention.

The amount of solvent employed may vary from none up to a volume ratio of 20/1 or more, however, it is usually more convenient to employ a volume solvent to monomer ratio of from about 3/1 to 6/1.

The temperature employed in the polymerization has not been found to be critical and can vary over a rather wide range of 10 to 15 below 0° C. up to about 90° C. However, it is usually more preferable to employ a polymerization temperature from about 0 to about 80° C.

The amount of catalyst employed in the practice of this invention has not been found to be too critical and may vary broadly from about 0.05 to about 4 parts calculated as parts of titanium tetrachloride as originally employed per hundred parts by weight of isoprene to the polymerized (phm).

Since the catalyst of this invention are highly susceptible to deterioration by such things as moisture, oxygen, and certain other impurities, the practice of the invention should be conducted in an oxygen and a moisture free atmosphere and to exclude other impurities, such as active hydrogen containing compounds, such as alcohols, amines, acids and the like, as well other impurities such as acetylene and cyclopentadiene.

The level or amount of 4,7-diaza-decane-1,10-diamine required to properly shortstop cis-1,4-polyisoprene can vary from 0.10 to 2.00 parts per hundred of rubber (phr), however, it has been observed that a more preferred range is 0.30 to 1.00 phr.

DESCRIPTION OF THE PREFERRED EMBODIMENTS

In the preferred embodiments of this invention three different polymerizations were conducted. The first polymerization employed TEPA as the stopping agent, the second polymerization employed TIPA as the stopping agent, and the third polymerization employed 4,7-diaza-decane-1,10-diamine ($N_4$ Amine).

In the following three examples, isoprene was polymerized in hexane as a solvent in a continuous manner in two 0.102 cubic meter reactors connected in a series equipped with agitation and temperature control devices. Diphenylether (DPE), triisobutylaluminum (Al) and titanium tetrachloride (Ti) were employed as the catalyst reactants. The polymerization conditions, the amount of catalyst components, amounts of shortstops and amounts of antioxidant, which was ditertiary butyl-p-cresol, are reported in parts per hundred of monomer (phm) or in the case of the antioxidant and the shortstop, parts per hundred of rubber (phr). At the end of the polymerization the polyisoprene cement was isolated by introducing the cement into a steam/hot water vessel to drive the solvent and unreacted monomer from the polyisoprene. The polyisoprene was then dewatered and air dried at 60° C. for approximately 2 to 3 hours. The physical and chemical properties of the polyisoprene in each of these examples is reported in each of the three examples.

EXAMPLE I

| Polymerization Conditions | |
|---|---|
| Isoprene charge wt. % | 19.0 |
| Catalyst ratio DPE/Al/Ti | 0.55/0.92/1.0 |
| Catalyst parts phm Ti + Al | 0.184 |
| Reaction temperature | 38° C. |
| Average time of run in hours | 6.77 |
| Conversion % isoprene to polymer | 68.3 |
| Shortstop, phr | 0.908 TEPA |
| Antioxidant, phr | 0.712 |
| Polymer Physicals | |
| Mooney M/L-4 | 89 |
| Gel % | 6.00 |
| Dilute Solution Viscosity (DSV) | 4.57 |

EXAMPLE 2

| Polymerization Conditions | |
|---|---|
| Isoprene charge wt. % | 19.4 |
| Catalyst ratio DPE/Al/Ti | 0.56/0.93/1.0 |
| Catalyst parts phm Ti + Al | 0.160 |

-continued

| | |
|---|---|
| Reaction temperature | 38° C. |
| Average time of run in hours | 6.82 |
| Conversion % isoprene to polymer | 61.8 |
| Shortstop, phr | 1.822 TIPA |
| Antioxidant, phr | 0.710 |
| Polymer Physicals | |
| Mooney M/L-4 | 89 |
| Gel % | 9.25 |
| DSV | 4.49 |

EXAMPLE 3

| | |
|---|---|
| Polymerization Conditions | |
| Isoprene charge wt. % | 19.4 |
| Catalyst ratio DPE/Al/Ti | 0.55/0.91/1.0 |
| Catalyst parts phm Ti + Al | 0.176 |
| Reaction temperature | 38° C. |
| Average time of run in hours | 6.78 |
| Conversion % isoprene to polymer | 63.26 |
| Shortstop, phr | 0.890 $N_4$ amine |
| Antioxidant, phr | 0.789 |
| Polymer Physicals | |
| Mooney M/L-4 | 86.5 |
| Gel % | 5.76 |
| DSV | 4.49 |

The Mooney viscosity as used in this application is a measure of the viscosity of the raw or uncured vulcanizate polyisoprene as measured according to the ASTM Test D-1646. The dilute solution viscosity (DSV) is determined by using about 0.25 gram of the polyisoprene dissolved in 50 ml of toluene and measuring the viscosity at 30° C. The percent of gel is measured by filtering the polymer employed in the DSV measurement through a very fine strainer and drying the filtered residue.

EXAMPLE 4

The various polyisoprene polymers produced in Examples 1, 2, and 3 were subjected to air oven aging at 70° C. to determine the effect of the particular shortstop on the aged Mooney values of the polyisoprene. In Table I, 7/70° C. is the Mooney value of the polyisoprene after aging 7 days at 70° C. 14/70° C. is the Mooney value after 14 days at 70° C. and 21/70° C. is the Mooney value after 21 days at 70° C. The results given in Table I below indicate that $N_4$ amine provides superior protection against oven aging of polyisoprene when compared to TIPA and TEPA as shortstops.

TABLE I

| Polyisoprene | Mooney @ 100° C. | | | |
|---|---|---|---|---|
| of Example | Orig | 6/70° C. | 14/70° C. | 21/70° C. |
| 1 | 92 | 91 | 80 | 67 |
| 2 | 92 | 81 | 70 | 52 |
| 3 | 91 | 91 | 91 | 90 |

EXAMPLE 5

The polymers prepared in accordance with Examples 1, 2 and 3 were compounded in the following recipe in a Banbury TM mixer:

| | Wt Parts |
|---|---|
| Polyisoprene | 100.0 |
| HAF Carbon Black** | 35.0 |
| Stearic Acid | 2.0 |

-continued

| | Wt Parts |
|---|---|
| Zinc Oxide | 5.0 |
| The mixing conditions were 3 minutes @ 70 RPM | |
| *N—t-butyl-2-benzothiazole sulfenamide | 0.7 |
| *Sulfur | 2.25 |
| Total | 144.95 |

*The mixing conditions for addition of * cure were 2½ minutes @ 50 rpm.
**HAF is a high abrasion furnace carbon black.

These compounded but yet uncured polyisoprenes were measured for green strength using an Instron TM Tester. The polyisoprene samples were sheeted on a mill and then molded in a press for 5 minutes at 93.5° C. using a standard tensile sheet cavity. The molded samples were cooled before removal from the press. The stress strain properties of the samples were measured at 24° C. using a crosshead speed of 5.08 centimeters/minute on dumbbells having a narrowed cross-section of 6.35 centimeters by 2.0 centimeters.

In Table II these symbols are used. $M_{100}$ is the modulus at 100 percent elongation, $M_{300}$ is the modulus at 300 percent elongation, $M_{500}$ is the modulus at 500 percent elongation and TS is the tensile strength at break, all being reported in millipascals (mPa).

The polyisoprenes prepared in accordance with Examples 1 and 2 showed similar green strengths, as can be ascertained from Table II below. However, the polyisoprene from Example 3, employing the $N_4$ amine as shortstop, has the highest modulus values and tensile strength at break values. This indicates that such a polyisoprene would be superior to the prior known polyisoprenes when employed to fabricate rubber articles for instance, tires, when they are shaped in the form of a Torus to be placed in a tire press to cure the green or uncured tire.

TABLE II

| Polyisoprene | Green Strength | | | |
|---|---|---|---|---|
| of Example | $M_{100}$ | $M_{300}$ | $M_{500}$ | TS |
| 1 | 275.8 | 213.7 | 206.8 | 330.9 |
| 2 | 241.3 | 193.0 | 179.3 | 213.7 |
| 3 | 289.6 | 255.1 | 282.7 | 627.4 |

EXAMPLE 6

In this example the polyisoprenes prepared in Examples 1, 2 and 3 were mixed and compounded in accordance with Example 5. After curing for 36 minutes at 149° C. they were tested in a vibrotester to determine their dynamic resilience according to ASTM-D-2231.

The results as shown in Table III indicate that a cured vulcanizate of the $N_4$ amine shortstopped polyisoprene has a higher dynamic resilience than the corresponding vulcanizates containing polyisoprenes shortstopped with TIPA or TEPA.

TABLE III

| | Dynamic Properties, 100° C. | | | | |
|---|---|---|---|---|---|
| Polyisoprene of Example | Modulus kg/cm$^2$ | Resil. % | I.V.* kp | Hx | Hf |
| 1 | 81.3 | 77.3 | 8.7 | 47.4 | 32.1 |
| 2 | 84.0 | 77.7 | 8.9 | 48.1 | 30.5 |
| 3 | 90.8 | 80.4 | 8.3 | 45.7 | 24.8 |

*inherent viscosity

The same polymers were tested for rebound according to ASTM D-1054. The results are given in Table IV.

The cured vulcanizate containing polyisoprene shortstopped with N4 amine also exhibits higher rebound values when compared with the vulcanizates containing polyisoprenes shortstopped with TIPA or TEPA.

TABLE IV

| Polyisoprene | Rebound | |
| of Example | Cold | Hot |
| --- | --- | --- |
| 1 | 76.4 | 85.9 |
| 2 | 73.5 | 83.5 |
| 3 | 78.1 | 87.8 |

EXAMPLE 7

In this example several polymerizations were conducted using the techniques of Examples 1, 2 and 3, except lower amounts of shortstopping agents were used. In experiment 1, the stopping agent used was TIPA in an amount of 1.760 phm; in Experiment 2, TEPA was used in an amount of 0.591 phm and in Experiment 3, N4 amine was used in an amount of 0.487 phm.

The resulting polyisoprenes were tested for original Mooney values and then were subsequently subjected to air oven aging at 70° C. for 15 days to determine the effect of the shortstoppers on the Mooney values of the polyisoprenes.

TABLE V

| | Mooney Values | |
| Polyisoprenes of | Original | Aged |
| --- | --- | --- |
| Experiment 1 | 86 | 35 |
| Experiment 2 | 95 | 64 |
| Experiment 3 | 90 | 83 |

The data shown in Table V indicate that the use of N4 amine as a shortstop for polyisoprene, results in superior protection against oven aging when compared to TIPA or TEPA as shortstops.

These polyisoprenes were also tested to determine the effect of work input during mastication on their Mooney values.

A Brabender TM fitted with an automatic integrator to measure work input (1), was used to masticate the polyisoprene samples. The batches were mixed to various levels of work input, (500, 1000, 2000, 3000 and 4000 mJ/m$^3$) while a nearly constant temperature of 138° C. was maintained at plus or minus 10° C. The resultant batches were then given ten passes and sheeted out on the mill for Mooney determination.

BRIEF DESCRIPTION OF THE DRAWING

As can be seen in the FIGURE the polyisoprene shortstopped with the N4 amine, under all conditions of work input shows a better retention of original Mooney than does polyisoprene shortstopped with TIPA or TEPA.

While certain representative embodiments and details have been shown for the purpose of illustrating the invention, it will be apparent to those skilled in this art that various changes and modifications may be made therein without departing from the scope of the invention.

I claim:

1. An improved polymerization process which comprises polymerizing isoprene under solution polymerization conditions in a hydrocarbon solvent with a catalyst system comprising a mixture of titanium tetrachloride and a trialkylaluminum or a trialkylaluminum etherate compound, wherein the polymerization is shortstopped with 4,7-diaza-decane-1,10-diamine, in an amount of 0.10 to 2.00 parts per hundred (phr) of rubber.

2. The polymerization process of claim 1 wherein the catalyst is a mixture of titanium tetrachloride and a trialkylaluminum etherate.

3. The polymerization process of claim 2 wherein the trialkylaluminum etherate is a trialkylaluminum phenyletherate.

4. The polymerization process of claim 3 wherein the trialkylaluminum phenyletherate is triisobutylaluminum phenyletherate.

5. The polymerization process of claim 1 wherein the 4,7-diaza-decane-1,10-diamine is used in an amount of 0.30 to 1.00 phr.

6. The polymerization process of claim 2 wherein the 4,7-diaza-decane-1,10-diamine is used in an amount of 0.30 to 1.00 phr.

7. The polymerization process of claim 4 wherein the 4,7-diaza-decane-1,10-diamine is used in an amount of 0.30 to 1.00 phr.

* * * * *